Figure 1:
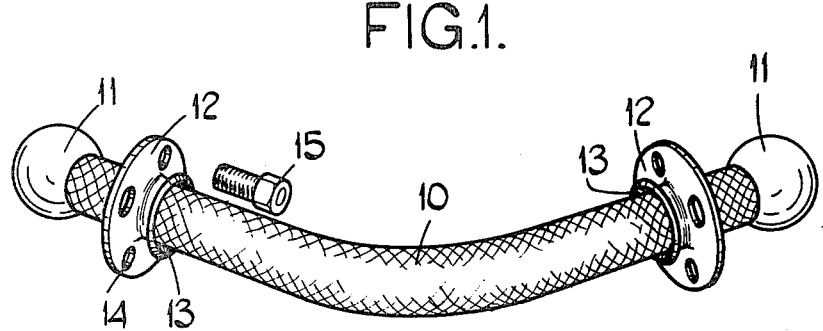

United States Patent [19]

Gaffney

[11] 4,220,358
[45] Sep. 2, 1980

[54] PIPE COUPLING

[75] Inventor: Edward N. Gaffney, Sutton Coldfield, England

[73] Assignee: Lucas Industries Limited, Birmingham, England

[21] Appl. No.: 6,166

[22] Filed: Jan. 24, 1979

[30] Foreign Application Priority Data

Feb. 7, 1978 [GB] United Kingdom ................. 4794/78

[51] Int. Cl.² .............................................. F16L 33/00
[52] U.S. Cl. .................................... 285/242; 285/331; 285/368
[58] Field of Search ................... 285/8, 242, 240, 241, 285/189, 222, 368, 412, 413, 159, 162, 245, 246, 247, 423, 337, 356, 353, 331

[56] References Cited

U.S. PATENT DOCUMENTS

| 2,738,993 | 3/1956 | Wilson | 285/242 X |
| 3,453,007 | 7/1969 | Roland | 285/242 X |
| 3,515,416 | 6/1970 | Pickert | 285/368 X |
| 3,552,776 | 1/1971 | Leymann | 285/229 X |
| 3,880,363 | 4/1975 | Guth et al. | 285/159 X |

FOREIGN PATENT DOCUMENTS

| 1521763 | 3/1968 | France | 285/242 |
| 526694 | 5/1955 | Italy | 285/242 |
| 895551 | 5/1962 | United Kingdom | 285/423 |
| 940947 | 11/1963 | United Kingdom | 285/241 |
| 1185766 | 3/1970 | United Kingdom | 285/337 |
| 1293458 | 10/1972 | United Kingdom | 285/356 |

Primary Examiner—Dave W. Arola

[57] ABSTRACT

A flexible hose connection comprises a premoulded length of hose having enlarged end portions. A pair of annular flanges are slidably mounted on the hose. Each enlarged end portion engages in a recess formed in a surface of a connecting part. A spigot in a bore in the part projects into the hose beyond the respective end portion; The flange has a convexly curved aperture therethrough, the minimum diameter of the aperture being less than the diameter of the respective end portion. Screws pass through holes in the flange and engage in screw-threaded bores in the part. Tightening of the screws deforms the end portion inwardly and outwardly to produce an effective high pressure seal which is simple to make and undo. Damage to the hose is minimized.

5 Claims, 2 Drawing Figures

U.S. Patent  Sep. 2, 1980  4,220,358

PIPE COUPLING

This invention relates to a pipe coupling and is particularly concerned with a high pressure flexible hose connection.

It is a problem with high pressure hose connections that fluid pressure, in service, within the hose tends to force the hose away from the part to which it is connected. Various proposals for preventing this happening have been made but such proposals generally either have the disadvantage of being relatively complicated and therefore expensive or they are not particularly efficient in operation. In one proposed arrangement, a separately manufactured sleeve is passed over the end of a flexible hose so that inwardly projecting teeth thereon engage with the surface of the hose. The assembly of hose and sleeve is then force-fitted into a tapered hole in a union until externally directed detents or sprags on the sleeve engage in a corresponding recess in the union so as to hold the hose in position. The end of the hose engages around and seals with a spigot or extension within the union, this extension or spigot having a frustoconical flared surface against which the inner surface of the hose seals. The effectiveness of such a construction is dependent upon the correct positioning of the sleeve on the hose and also depends upon the correct engagement of the assembly of hose and sleeve with the union. Thus, there is a risk that a fluid tight coupling will not be consistently effected with such a design and the design also suffers from the disadvantage that both the sleeve and the union are of quite complicated construction so that manufacturing costs are relatively high.

It is known to provide a permanent connection by crimping a retaining member on an end portion of a hose after the latter has been forced onto a spigot extending from a part to which the hose is to be connected. This crimping operation is a fairly critical operation and there is no possibility of detaching the connection once made without damaging either the end of the hose or the sleeve used in the crimping operation.

It is therefore an object of the present invention to provide a very simple but yet effective high pressure flexible hose connection in which the above disadvantages are obviated or mitigated.

According to the present invention, there is provided a high pressure flexible hose connection comprising a flexible hose having an integral end portion of enlarged cross-section, a fixing member slidably mounted on the hose, the fixing member having a hose receiving aperture therethrough which has a diameter less than that of the enlarged end portion of the hose, an associated part to which the hose is to be connected, said associated part having a fluid passage therein opening into a recess in a surface of the associated part, a spigot having a passage therethrough in communication with the fluid passage in the associated part, said spigot extending from the base of the recess, the recess being adapted to receive the enlarged end portion of the hose, and means being provided for urging the fixing member and the associated part together whereby, in use, the enlarged end portion of the flexible hose is urged against the base of the recess around the spigot and thus deformed inwardly and outwardly to effect a seal between the hose and the associated part.

In one embodiment the fixing member is an apertured flange and screws are provided for connecting the fixing member and the associated part together. In another embodiment, the fixing member is in the form of a screw-threaded sleeve which engages a correspondingly screw-threaded sleeve on the associated part.

It is preferred for the hose receiving aperture in the fixing member to have a convexly curved surface in the longitudinal direction of the aperture so as to minimise damage to the hose in service.

Also according to the present invention, there is provided a flexible, high pressure hose constructed and adapted to be used in the hose connection of the present invention, said hose having, at at least one end thereof, an integral portion of enlarged cross-section.

Preferably, the hose is in the form of a pre-moulded length having one of the enlarged end portions at each end thereof.

Figure 2:
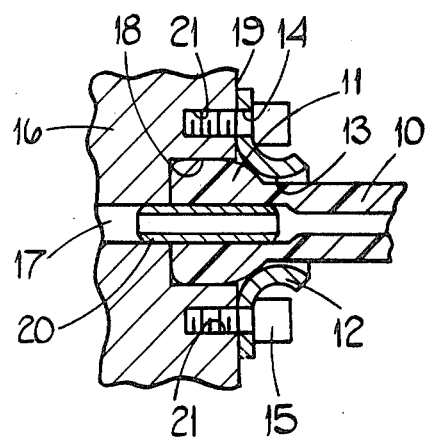

An embodiment of the present invention will now be described by way of example, with reference to the accompanying drawing, in which:

FIG. 1 is a perspective view of a length of high pressure flexible hose according to the present invention, and FIG. 2 is a longitudinal sectional view of a coupling according to the present invention utilizing the hose of FIG. 1.

Referring now to the drawing, a hose 10 is pre-moulded to the desired length with a pair of integral, part-spherical end portions 11. The hose is formed of rubber reinforced with a filamentary braiding. After moulding, a pair of annular, pressed metal fixing flanges 12 are fitted onto hose 10. For this purpose, each flange 12 is provided with a radial slit (not shown) therein to enable it to be opened up to pass over the hose 10. Alternatively, each flange 12 can be a continuous annulus having a hole size sufficent to pass over one of the end portions 11. In such a construction, after fitting onto the hose 10, a controlled axial load is applied to each flange 12 to deform so as to reduce the diameter of the hole therein to less than the outer diameter of the end portion 11. Each flange 12 has a central hose receiving aperture 13 therethrough. The aperture 13 is convexly curved in the longitudinal direction so as to provide flared ends to the aperture 13. This prevents the surface of the hose 10 from being damaged in service when flexing of the hose 10 takes place relative to the flanges 12. The minimum diameter of the hose-receiving aperture 13 is marginally greater than that of the main body of the hose 10 so that the flange 12 can slide longitudinally relative to the hose 10 and can also be rotated relative to the hose 10. However, the minimum diameter of the aperture 13 is less than that of the enlarged end portions 11 of the hose 10 as will be readily apparent from FIG. 2 of the drawing. Outwardly of the aperture 13, each flange 12 is provided with three holes 14 therethrough for receiving fixing screws 15 as will be described hereinafter.

Referring now to FIG. 2 of the drawing, there is illustrated a part 16 to which the hose 10 is to be connected. The part 16 has a fluid passage 17 therein to be connected with the interior of the hose 10. The fluid passage 17 opens into a recess 18 formed in one surface 19 of the part 16. Mounted in the passage 17 is a spigot 20 which extends from the base of the recess 18 to the outside of the part 16. The diameter of the recess 18 is marginally greater than the diameter of an end portion 11 to be engaged therewith as will be described hereinafter. The part 16 is provided with three internally screw threaded bores 21 in its surface 19.

In order to effect the above described connection, one of the enlarged end portions 11 of the hose 10 is inserted into the recess 18 so that the spigot 20 passes into the bore in the hose 10 until the associated end of the hose 10 abuts against the base of the recess 18. Then the associated flange 12 is slid along the hose 10 and angularly orientated so that the holes 14 therein are aligned with the screw threaded bores 21 in the part 16. Then the screws 15 are passed through the holes 14 and engage with the bores 21. As will be seen from FIG. 2, the length of the enlarged end portion 11 is greater than the depth of the recess 18 so that the portion of the flange 12 surrounding the aperture 13 therein engages against an adjacent end of the enlarged end portion 11 and, upon tightening of the screws 15, the enlarged end portion 11 is deformed so that it seals inwardly around the spigot 20 and outwardly against the side wall of the recess 18. This arrangement provides an extremely simple and effective form of seal and the ultimate deformation of the end portion 11 is limited to that amount of deformation permitted before the surface 19 is engaged by the facing surface of the flange 12. Dis-engagement of the hose 10 from the part 16 is opposed by the flange 12 in a very effective manner so that there is a minimum risk of dis-engagement even when high pressures exist within the hose and the fluid passage 17. In order to dismantle the coupling, it is merely necessary to undo the screws 15 and withdraw the hose since the deforming pressure on the end portion 11 thereof has been released by release of the flange 12.

In the embodiment illustrated, the external end of the spigot 20 terminates, in the completed coupling, in the region of the portion of minimum diameter of the aperture 13 in the flange 12, i.e. it terminates within the hose 10 beyond the associated enlarged end portion 11. Thus, it is ensured that unwanted collapsing of the hose 10 does not occur so that obscuring or restricting the bore of the hose 10 is avoided.

I claim:

1. A high pressure flexible hose connection comprising a flexible hose having an integral end portion of enlarged cross-section, a fixing member slidably mounted on the hose, the fixing member having a hose receiving aperture therethrough which has a diameter less than that of the enlarged end portion of the hose, an associated part to which the hose is to be connected, said associated part having a fluid passage therein opening into a base of a recess which has a cylindrial side wall and which is provided in a surface of the associated part, a spigot having a passage therethrough in communication with the fluid passage in the associated part, said spigot extending from the base of the cylindrical recess, the cylindrical recess being adapted to receive the enlarged end portion of the hose and having a diameter marginally greater than that of the enlarged end portion of the hose, and means being provided for urging the fixing member and the associated part together whereby, in use, the enlarged end portion of the flexible hose is urged against the base of the recess around the spigot and thus deformed inwardly and outwardly to effect a seal between the hose and the spigot and the side wall of the cylindrial recess of the associated part.

2. A hose connection as claimed in claim 1, wherein the fixing member is an apertured flange and screws are provided for connecting the fixing member and the associated part together.

3. A hose connection as claimed in claim 1, wherein the hose receiving aperture in the fixing member has a convexly curved surface in the longitudinal direction of the aperture.

4. A hose connection as claimed in claim 1, wherein the spigot is of a length sufficient to extend through the enlarged end portion of the hose when the latter is fitted into the recess.

5. A hose as claimed in claim 1, in the form of a premoulded length having one of the enlarged end portions at each end thereof.

* * * * *